UNITED STATES PATENT OFFICE.

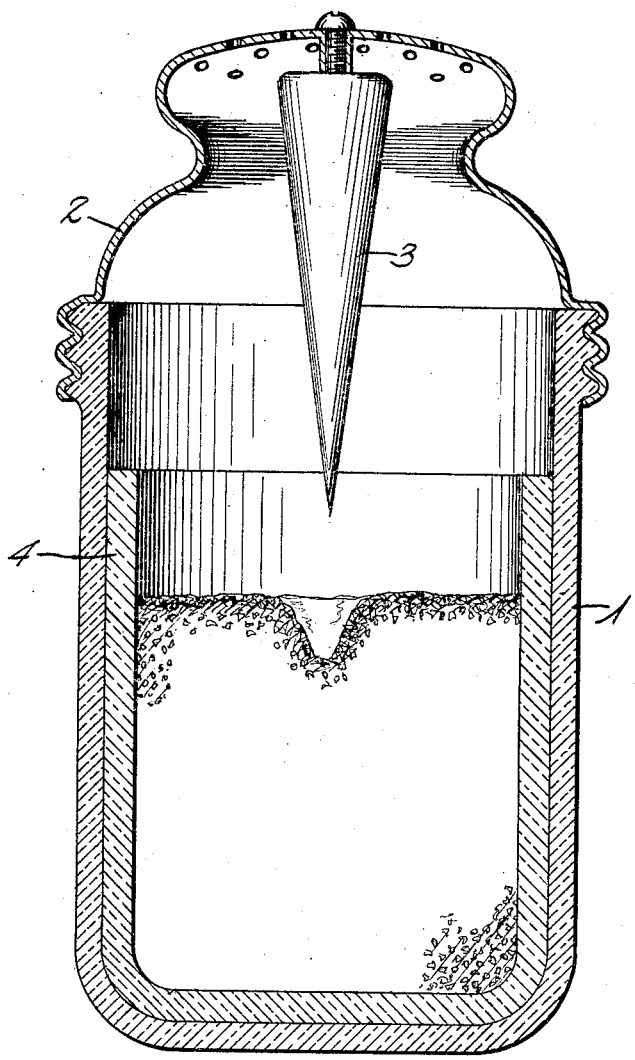

PHILIP C. REILLY, OF BROOKLYN, NEW YORK.

SALT-CELLAR.

1,274,597.

Specification of Letters Patent.   Patented Aug. 6, 1918.

Application filed March 14, 1918.   Serial No. 222,384.

*To all whom it may concern:*

Be it known that I, PHILIP C. REILLY, a citizen of the United States, residing in the borough of Brooklyn, city of New York, county of Kings, and State of New York, have invented certain new and useful Improvements in Salt-Cellars, of which the following is a specification.

This invention is a shaker especially adapted for use as a saltcellar. The object of the invention is to produce an effective non-clogging shaker especially for salt.

In the accompanying drawing forming a part hereof and showing a vertical central section of one form of my invention, 1 is a container provided with a detachable perforated cap 2 which is provided with a dependent spike 3 that extends downwardly into and only part way toward the bottom of the slidable cup 4 that is mounted with a sliding fit within the container 1. The cup 4 is shorter than the container 1 and is the principal holder of the material to be shaken. When the shaker is shaken for discharge of contents through the perforated cap, the cup 4 slides back and forth and the material in the cup is disintegrated by contact with the spike 3. The close sliding fit of the cup 4 within the container effectively prevents clogging of the cup with the inner wall of the container.

What I claim is:

A shaker having a perforated cap provided with a dependent spike; a container covered by the cap; and within the container a therein-movable cup having its open end toward the free end of the spike, the latter extending only part way to the bottom of the cup, and the exterior wall of the cup being in close sliding contact with the interior wall of the container.

In testimony whereof I have hereunto set my hand this 26th day of February, 1918.

PHILIP C. REILLY.

Copies of this patent may be obtained for five cents each, by addressing the "Commissioner of Patents, Washington, D. C."